United States Patent [19]

Peppers et al.

[11] Patent Number: 4,827,529
[45] Date of Patent: May 2, 1989

[54] LINES AND CHARACTERS SEPARATION APPARATUS

[75] Inventors: Norman A. Peppers, Belmont; James R. Young, Palo Alto, both of Calif.; Hisami Nishi; Hiroshi Ueno, all of Osaka, Japan; Kazuo Katsuki, Osaka, Japan

[73] Assignee: Nippon Sheet Glass Co., Ltd., Osaka, Japan

[21] Appl. No.: 38,633

[22] Filed: Apr. 14, 1987

[51] Int. Cl.[4] .............................................. G06K 9/34
[52] U.S. Cl. ......................................... 382/9; 382/32; 382/46; 382/68
[58] Field of Search .................... 382/9, 31, 32, 46, 68

[56] References Cited

U.S. PATENT DOCUMENTS

| | | | |
|---|---|---|---|
| 3,160,854 | 12/1964 | Gregory | 382/68 |
| 3,244,889 | 4/1966 | Preston et al. | 382/68 |
| 3,252,140 | 5/1966 | Lemay et al. | 382/32 |
| 4,338,588 | 7/1982 | Chevillat et al. | 382/46 |
| 4,527,283 | 7/1985 | Ito et al. | 382/9 |

*Primary Examiner*—Leo H. Boudreau
*Assistant Examiner*—Donald J. Daley
*Attorney, Agent, or Firm*—Woodcock Washburn Kurtz Mackiewicz & Norris

[57] ABSTRACT

In a lines and character separation apparatus for separating lines and characters in a document page, the separation being a step in pattern recognition, images are multiplied from one area within the page, a plurality of photosensor arrays are used which have different alignment directions of pluralities of light-receiving elements thereof and which are respectively paired with the multiple images, and the lines and the characters can be separated at high speed.

3 Claims, 3 Drawing Sheets

LINES AND CHARACTERS SEPARATION APPARATUS

BACKGROUND OF THE INVENTION

1. Field of the Invention

The present invention relates to a lines and characters separation apparatus for separating lines or characters from each other in a document page, the separation being one step in pattern recognition.

2. Description of the Prior Art

Several conventional lines and characters separation apparatuses have been proposed.

Examples of these apparatuses are an apparatus for scanning a document page to directly read line spacing according to density distributions of accumulation signals of character portions in lines and accumulation signals of non-character portions, and an apparatus for statistically calculating line spacing on the basis of the density distributions of the accumulation signals.

For each separated line, characters belonging to it are separated in the same manner as in line separation.

Raster or parallel scanning along a predetermined direction is performed as document page scanning. According to each scanning scheme, scanning time-serially progresses from a start point to an end point of the document page. The predetermined scanning direction is corrected by scanning the same document page along a corrected direction or by analyzing the previous data, i.e., by utilizing a processor.

In either above-described apparatus, the document page is time-serially scanned to require a long period of time for separating the lines and the characters.

Furthermore, correction of the scanning direction, which is required by a line inclination or the like, can be performed only after at least one scanning cycle is completed. Therefore, in this case, a longer period of time is required to separate the lines and the characters.

SUMMARY OF THE INVENTION

A lines and characters separation apparatus according to the present invention comprises multiplying means for multiplying one area within a page into a plurality of images and a plurality of photosensor arrays each of which has a plurality of aligned light-receiving elements and which have different alignment directions of the light-receiving elements and are respectively paired with the plurality of images, wherein lines and characters in the page are separated from each other on the basis of a density distribution of detection outputs from the plurality of light-receiving elements in each photosensor array.

In the lines and characters separation apparatus according to the present invention, the plurality of images are multiplied from one area within the page. The plurality of photosensor arrays have different alignment directions of the light-receiving elements and are paired with the plurality of images, respectively. Information associated with lines and information associated with characters can be instantaneously obtained. The separation between the lines, the separation between the characters, and the separation between the lines and the characters can be simultaneously performed.

The plurality of photosensor arrays having different alignment directions of the light-receiving elements thereof are respectively paired with the plurality of images. Therefore, the same processing as in noninclined lines and characters can be performed for inclined lines and characters.

In the lines and characters separation apparatus according to the present invention, the information associated with lines and information associated with the characters can be instantaneously obtained. Furthermore, the separation between the lines, the separation between the characters, and the separation between the lines and the characters can be simultaneously performed. And furthermore, the same processing as in noninclined lines and characters can be performed for inclined lines and characters. Therefore, the lines and the characters can be separated at high speed.

DETAILED DESCRIPTION OF THE PREFERRED EMBODIMENT

An embodiment of the present invention will be described in detail with reference to FIGS. 1 to 6.

Figure 1:
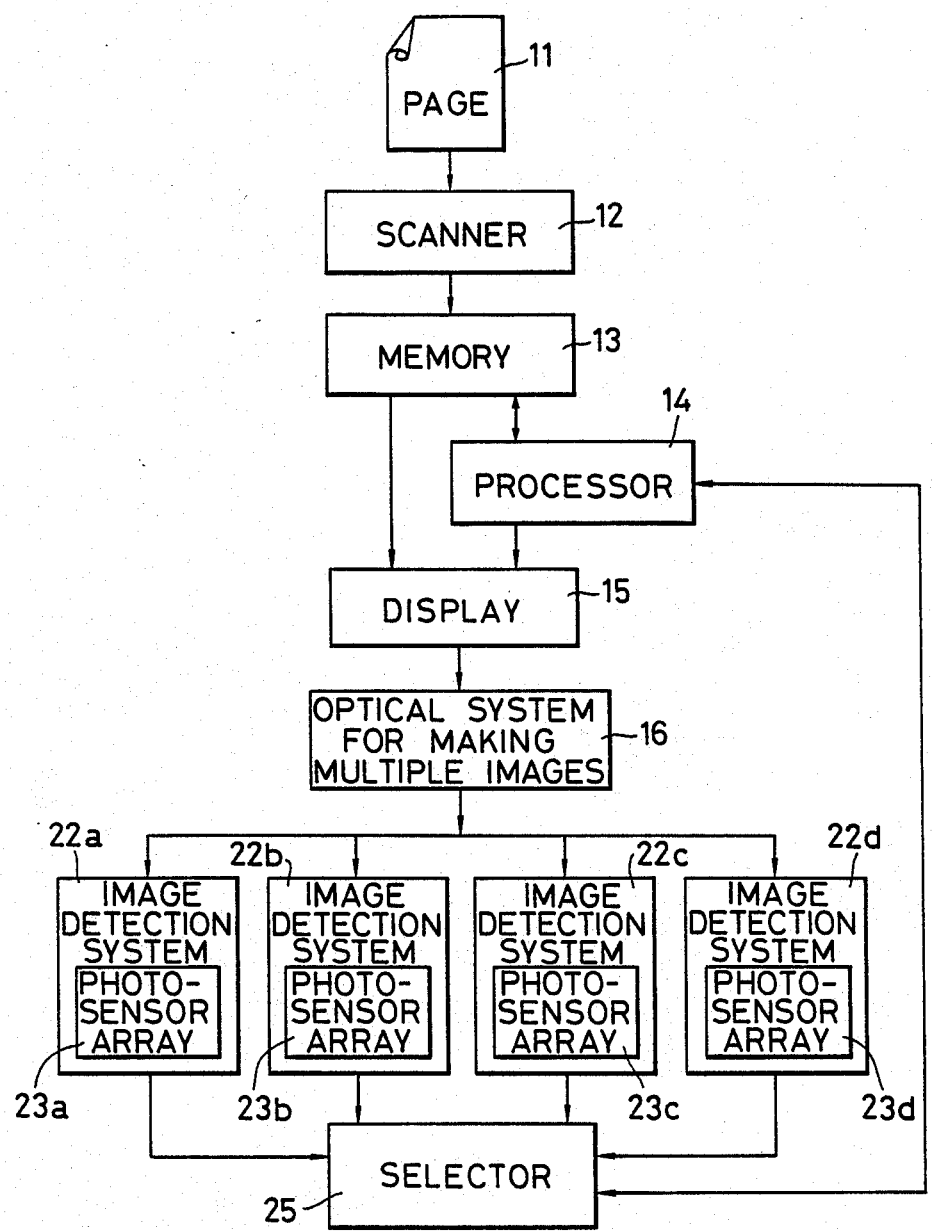
FIG. 1 is a block diagram showing a lines and characters separation apparatus according to an embodiment of the present invention.

FIG. 1 shows the overall arrangement of the lines and characters separation apparatus according to an embodiment. In this embodiment, a page 11 of a document is scanned by a scanner 12, and the read page 11 is recorded in a memory 13.

The scanner 12 may have a low resolution of 8 samples/mm or less. Coordinate data representing a document format detected by a page segmentor (not shown), i.e., coordinate data obtained by dividing the page 11 into areas having identical formats is transferred to the memory 13.

A processor 14 refers to format coordinate data in a memory 13 and divides the identical format area within the page 11 in the memory 13 into proper areas. One of these areas is transferred from the memory 13 and displayed on a display 15.

Figure 2:
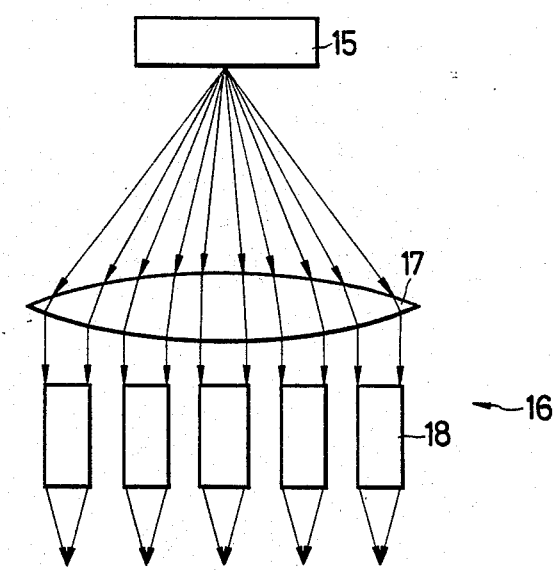
FIG. 2 is a side view showing an optical system for making multiple images.

The output from the display 15 is input to an optical system 16 for making the multiple images. The optical system 16 comprises a single convex lens 17 and lens array 18, as shown in FIG. 2.

The display 15 is located at the focal point of the convex lens 17 on the side opposite to the lens array 18. An image 21 (FIG. 4) of the area belonging to the page 11 and displayed on the display 15 is multiplied in number corresponding to the number of lenses at focal points of the lens array 18 on the side opposite to the convex lens 17.

In this embodiment, the multiple images 21 are simultaneously input to four image detection systems 22a to 22d. The image detection systems 22a and 22b respectively comprise photosensor arrays 23a to 23d having different alignment directions and are simultaneously operated.

Figure 3:
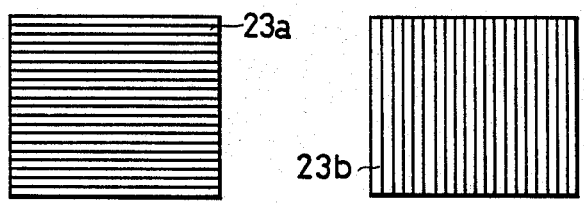
FIGS. 3 and 6 are respectively front views of photosensor arrays.

The image detection systems 22a and 22b have the photosensor arrays 23a and 23b, respectively, as shown in FIG. 3, and serve to detect a laterally written document (i.e., a document with lines of characters written laterally across each page of the document). The image detection systems 22c and 22d serve to detect a vertically written document (i.e., a document with lines of characters written vertically up and down each page of the document).

Figure 4:
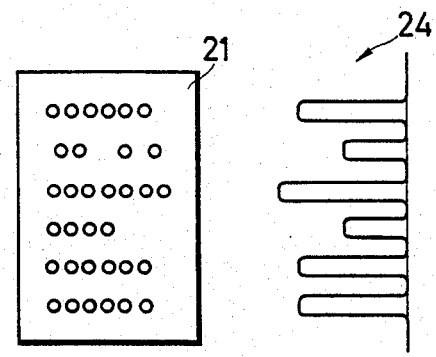
FIG. 4 is a schematic view for explaining a method of separating the lines from each other.

If documents in the multiple images 21 consist of laterally written characters as shown in FIG. 4, a photodetection output 24 having a density distribution shown in FIG. 4 is obtained from the photosensor array 23a. Line spacing is represented by a low-density portion of the photodetection output 24. The lines can be separated by a selector 25 on the basis of the photodetection output 24.

If characters in the image 21 have regular pitches in each line, a photodetection output representing regular pitches is output from the photosensor array 23b as in the photodetection output 24. Therefore, separation between the characters can be simultaneously performed with separation between the lines.

Figure 5:
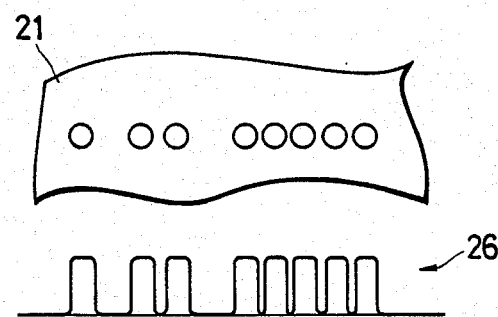
FIG. 5 is a schematic view for explaining a method of separating the characters from each other.

If the characters in the image 21 have irregular pitches in each line, as shown in FIG. 5, line separation coordinates obtained as in FIG. 4 are stored in the memory 13 by the selector 25. For each separated line, a photodetection output 26 shown in FIG. 5 is obtained again, and the characters are separated from each other by the selector 25 on the basis of the photodetection output 26.

Separation between the lines and separation between the characters in all areas within the page 11 are performed in this manner and completed.

Figure 6:
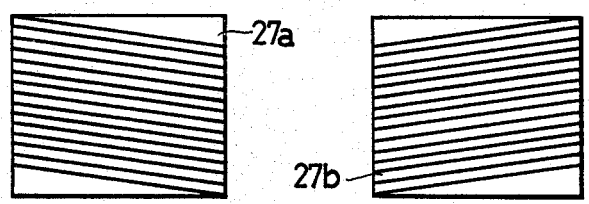

If the apparatus is constituted in such a way that a plurality of inclined photosensor arrays 27a, 27b and the like as shown in FIG. 6 are arranged, the inclination angles of the rows and columns are obtained from the photodetection outputs from the photosensor arrays 27a, 27b and the like, inclination angle data is transferred to the selector 25 through the processor 14, the selector 25 determines, on the basis of the transferred data, which one of the detection outputs from the optical detection systems 22a to 22d is employed, then, the inclined rows and the inclined columns as well as the characters in the row or column can be separated from each other.

What is claimed is:

1. A method of separating lines and characters on a page, comprising:
   (a) providing multiplying means for multiplying an image of one area within the page into a plurality of images, said multiplying means including a single convex lens spaced by a focal length thereof from a position of said image, and a lens array extending in a direction perpendicular to an optical axis of said convex lens in an optical path of light passing from said image through said convex lens;
   (b) providing a plurality of photosensor arrays, each said photosensor array having a plurality of aligned light-receiving elements for producing a detection output therefrom;
   (c) pairing said plurality of photosensor arrays respectively with said plurality of images;
   (d) positioning said plurality of aligned light-receiving elements of each said photosensor array in a different direction of alignment from the alignment direction of the other photosensor arrays; and
   (e) simultaneously operating said plurality of photosensor arrays to separate lines and characters in the page on the basis of a density distribution of the detection outputs from said plurality of light-receiving elements in each photosensor array.

2. The method according to claim 1, wherein step (b) comprises the steps of:
   (a) providing a photosensor array having vertically aligned light-receiving elements; and
   (b) providing a photosensor array having laterally aligned light-receiving elements.

3. The method according to claim 2, further comprising the step of providing a photosensor array having inclined light-receiving elements.

* * * * *